United States Patent Office 3,549,717
Patented Dec. 22, 1970

3,549,717
**PROCESS FOR THE PRODUCTION OF
1,5,9-CYCLODODECATRIENE**
Jo Itakura, Hisao Tanaka, and Hiroo Ito, Aichi, Japan,
 assignors to Gosei Chemical Industry Co., Ltd., Tokyo,
 Japan
No Drawing. Filed Feb. 28, 1969, Ser. No. 803,468
 Claims priority, application Japan, Feb. 28, 1968,
 43/12,278; Mar. 18, 1968, 43/17,269; July 8,
 1968, 43/47,082; Aug. 13, 1968, 43/57,096; Oct.
 22, 1968, 43/76,505; Oct. 23, 1968, 43/76,506
Int. Cl. C07c *13/00, 3/10*
U.S. Cl. 260—666         26 Claims

ABSTRACT OF THE DISCLOSURE

A process for the production of a 1,5,9-cyclododecatriene by the cyclic trimerization of a conjugated open chain diolefin using as catalyst an alkylaluminum chloride and a complex compound of titanium tetrachloride and an organic compound such as a ketone, an aromatic aldehyde, an aliphatic nitro compound, or an aromatic nitro compound. Catalyst useful for the same is also disclosed.

BACKGROUND OF THE INVENTION

Field of the invention

The present invention relates to a process for the production of a 1,5,9-cyclododecatriene and a substituted 1,5,9-cyclododecatriene by the cyclic trimerization of conjugated open chain diolefins.

SUMMARY OF THE INVENTION

The present invention involves a novel process for the production of a 1,5,9-cyclododecatriene by the cyclic trimerization of a conjugated open chain diolefin utilizing as the catalyst an alkylaluminum chloride and a complex compound of titanium chloride and an organic compound such as a ketone, an aromatic aldehyde, an aliphatic nitro compound, or an aromatic nitro compound.

A novel catalyst composition for the trimerization of said conjugated open chain diolefin comprises an alkylaluminum chloride and a complex compound of a titanium halide and an organic compound. Most preferred organic compounds utilized in forming the complex are N-vinylpyrrolidone, ketones, aromatic aldehydes, β-cyanopropionaldehyde, β-formylpropionate, nitrile compounds, carboxylic acid ester, an aliphatic nitro compound, and an aromatic nitro compound.

Various preferred conditions are set out in the specification.

An object of the present invention is to provide a catalyst composition for cyclic trimerization of conjugated diolefins having a high activity and also a process for the cyclic trimerization of conjugate diolefins using the aforesaid catalyst composition.

DESCRIPTION OF THE PREFERRED EMBODIMENTS

According to the process of this invention, a 1,5,9-cyclododecatriene is prepared by trimerizing a conjugated open chain diolefin such as 1,3-butadiene, isoprene, and 1,3-pentadiene in an inactive solvent in the presence of a catalyst comprising an alkylaluminum chloride and a complex compound of a titanium halide and N-vinylpyrrolidone, a ketone, an aromatic aldehyde, β-cyanopropionaldehyde, a β-formylpropionate, a nitrile, a carboxylic acid ester, an aliphatic nitro compound, or an aromatic nitro compound.

The process of this invention can be effectively applied to the cyclic trimerization of a pure conjugated open chain diolefin as well as a conjugated diolefin containing other olefins or saturated hydrocarbons. That is, by the process of this invention, the trimerization of the aforesaid conjugated diolefin can be conducted with the formation of almost no solid polymers and also with the formation of a very low proportion of liquid linear polymers.

Furthermore excellent features of the present invention are that the catalyst used in the present invention is soluble in reaction solvents, which results in conducting the reaction in homogeneous systems and also the reaction can be led in the desired direction for the formation of trans.trans.cis-1,5,9-cyclododecatriene due to the high stereo-specificity of the catalyst.

The 1,5,9-cyclododecatriene prepared by the process of this invention is useful not only as an intermediate product for nylon but also as raw materials for various useful organic compounds.

The catalyst used in the present invention comprises an alkylaluminum chloride and a complex compound of a titanium halide and the aforesaid organic compound. Such a catalyst may be readily obtained by reacting a titanium halide such as titanium tetrachloride and titanium tetrabromide, the former being preferred, with N-vinylpyrrolidone, a ketone, an aromatic aldehyde, β-cyanopropionaldehyde, a β-formylpropionate, a nitrile, a carboxylic acid ester, an aliphatic nitro compound or an aromatic nitro compound, in an atmosphere inert thereto, such as a nitrogen atmosphere at a low temperature, e.g., lower than 60° C., preferably in a solvent such as an aromatic hydrocarbon, e.g., benzene, xylene, ethylbenzene, toluene, propylbenzene, and isopropylbenzene; an alicyclic hydrocarbon, e.g., cyclohexane, methylcyclopentane, methylcyclohexane, demethylcyclohexane, and cyclocotane; an aliphatic hydrocarbon, e.g., n-hexane, n-heptane, and n-octane; a petroleum ether, a petroleum benzine; and ligroin. Furthermore, the yield of the product by the process of this invention is almost theoretical.

The amount of the organic compound described above used for the preparation of the complex compound is preferably 1–5 moles, most preferably 1–2 moles, per one mole of the titanium halide, such as titanium tetrachloride.

The catalyst of the present invention thus prepared is a complex compound in which one or two molecules of the above-mentioned organic compound have been coordinated to one molecule of the titanium halide. The catalyst is stable in a nitrogen stream, but is gradually decomposed in wet air. However, the catalyst can be handled more easily than conventional catalysts for preparing 1,5,9-cyclododecatrienes, such as, titanium tetrachloride.

Practical examples of the organic compounds used for the complex compounds with the titanium halide, such as titanium tetrachloride, are as follows:

As the ketones, there can be used aliphatic ketones, such as acetone, methyl ethyl ketone, methyl propyl ketone, diethyl ketone, methyl butyl ketone, ethyl propyl ketone, methyl amyl ketone, and methyl hexanone; alicyclic ketones such as cyclobutanone, cyclopentanone, cyclohexanone, cycloheptanone, cyclooctanone, and cyclododecanone; aromatic ketones such as acetophenone, methyl benzyl ketone, phenyl ethyl ketone, and benzophenone; halogenated ketones such as benzoyl chloride and the like; and diketones (except β-diketone), such as, acetonyl acetone and the like.

Illustrative aldehydes are benzaldehyde, anisaldehyde, tolualdehyde, naphthaladehyde, cinnamaldehyde, phenyl acetaldehyde, phenylpropionaldehyde, and the like.

Illustrative β-formylpropionates are methyl β-formylpropionate, ethyl β-formylpropionate, isopropyl β-formylpropionate, and the like.

Illustrative nitrile compounds are aromatic nitriles such as benzonitrile, benzylnitrile, tolunitrile, and naphthonitrile; aliphatic nitriles such as acetonitrile, ethyl cyanide, propyl cyanide, and butyl cyanide; olefin nitriles such as acrylonitrile, allyl cyanide, fumaronitrile, and cinnamonitrile; dicyano compounds such as molononitrile, glutaronitrile, and succinonitrile; and halogenated aliphatic nitriles such as chloroacetonitrile; and the like.

As the carbonic acid esters, there are esters represented by the general formula

$R_1COOR_2$ or $R_3OOCR_4COOR_3$ wherein $R_1$ represents an alkyl group, an alkenyl group, a halogen- or cyano-substituted alkyl group, or an aryl group; $R_2$ represents an alkyl group, a cycloalkyl group, or an aryl group; $R_3$ represents an alkyl group or a cycloalkyl group; and $R_4$ represents an alkylene group or an arylene group.

Examples of such esters are methyl acetate, ethyl acetate, propyl acetate, butyl acetate, methyl propionate, ethyl propionate, methyl butyrate, ethyl butyrate, methyl valerate, ethyl valerate, methyl caproate, ethyl caproate, methyl caprate, ethyl caprate, methyl stearate, ethyl stearate, cyclohexyl acetate, cyclohexyl propionate, phenyl acetate, phenylpropionate, phenyl butyrate, methyl acrylate, ethyl acrylate, butyl acrylate, 2-ethylhexyl acrylate, methyl methacrylate, ethyl methacrylate, butyl methacrylate, cyclohexyl acrylate, benzyl acrylate, methyl monochloroacetate, ethyl monochloroacetate, butyl monochloroacetate, ethyl dichloroacetate, ethyl trichloroacetate, cyclohexyl monochloroacetate, cyclohexyl dichloroacetate, cyclohexyl bromoacetate, phenyl monochloroacetate, phenyl dichloroacetate, phenyl bromoacetate, methyl cyanoacetate, ethyl cyanoacetate, propyl cyanoacetate, cyclohexyl cyanoacetate, cycloheptyl cyanoacetate, phenyl cyanoacetate, β-naphthyl cyanoacetate, methyl benzoate, ethyl benzoate, propyl benzoate, butyl benzoate, cyclohexyl benzoate, cycloheptyl benzoate, phenyl benzoate, dimethyl malonate, diethyl malonate, dimethyl succinate, diethyl succinate, dimethyl adipate, diethyl adipate, dicyclohexyl adipate, dimethyl maleate, diethyl maleate, dipropyl maleate, dimethyl fumarate, diethyl fumarate, dibutyl fumarate, dimethyl phthalate, diethyl phthalate, dicyclohexyl phthalate, dicycloheptyl phthalate, dimethyl oxalate, and diethyl oxalate.

Illustrative aliphatic nitro compounds are nitromethane, nitroethane, nitropropane, nitrobutane, nitropentane, nitrohexane, nitroheptane, nitrooctane, nitrononane, nitrodecane, nitroundecane, nitrododecane, phenylnitromethane, and phenylnitroethane.

Illustrative aromatic nitro compounds are nitrobenzene, nitrotoluene, ethylnitrobenzene, dimethylnitrobenzene, nitrocumene, butylnitrobenzene, isopropylnitrotoluene, diethylnitrobenzene, nitronaphthalene, nitrobiphenyl, and nitroacenaphthene.

On the other hand, the alkylaluminum chloride which is another component of the catalyst composition used in the present invention is preferably a compound represented by the general formula

$R_mAlCl_{3-m}$ wherein R represents an alkyl group and $1.5 \leq m \leq 2$. In general, R is an alkyl group having 2–6 carbon atoms.

Examples of such alkylaluminum halides are diethylaluminum chloride, ethyl aluminum sesquichloride, diisopropylaluminum chloride, isopropylaluminum sesquichloride and the like. They may be used alone or as a mixture thereof. Among them, diethylaluminum chloride and ethylaluminum sesquichloride are particularly preferable and also compounds having compositions between them are useful.

Moreover, as the reaction solvent, there can be employed organic solvents inactive to the catalyst components, for example, there are aliphatic hydrocarbons such as n-hexane, n-heptane, and n-octane; aromatic hydrocarbons such as benzene, toluene, xylene, ethylbenzene, propylbenzene, and isopropylbenzene; alicyclic hydrocarbons such as methyl cyclopentane, cyclopentane, dimethylcyclohexane, methylcyclohexane, cyclohexane, cyclooctane, cyclooctene, 1,5-cyclooctadiene, cyclododecene, and 1,5,9-cyclododecatriene; and halogenated hydrocarbons such as monochlorobenzene and dichlorobenzene. Among them, particularly useful solvents are benzene, toluene, xylene, ethylbenzene, isopropylbenzene, 1,5,9-cyclododecatriene, 1,5-cyclooctadiene, and chlorobenzenes.

The preferred ratio of the titanium halide and the alkylaluminum chloride of the complex compound used as the catalyst in this invention is that more than 2 gram atoms, in particular, and most preferably 10–500 gram atoms, of aluminum are present to one gram atom of titanium.

The concentration of catalyst in the solvent is preferably one that 0.01 to 100 millimoles of the complex compound of titanium halide is contained in one liter of the reaction mixture. Even at a low concentration of catalyst, the trimerization of the conjugated open chain diolefin proceeds rapidly.

Upon use of the catalyst composition of this invention, it is desirable to mix the alkylaluminum chloride and the complex compound of the titanium halide with a solvent in a nitrogen atmosphere, and to age the mixture at 20–80° C. By such a procedure, a homogeneous catalyst liquid can be obtained.

The trimerization of the conjugate diolefin of the present invention can be practiced under normal pressure, and at a reaction temperature of from −20° C. to 150° C. preferably from 20° C. to 80° C.

After the reaction is finished, any remaining catalyst is inactivated by using water or an alcohol such as methanol, ethanol, propanol, butanol and the like, and the solution is, if necessary, washed with a diluted mineral acid such as hydrochloric acid or sulfuric acid, or an aqueous solution of an alkali such as sodium hydroxide, to remove the catalyst residue. After recovering the solvent, the system is subjected to steam distillation or vacuum distillation to provide the product, i.e., 1,5,9-cyclodecatriene, at a good yield.

The invention will now be explained with reference to the following examples. In Examples 1–11, complex compounds of titanium tetrachloride and N-vinylpyrrolidone were used as one compound of the catalyst; in Examples 12–24, complex compounds of titanium tetrachloride and the ketones shown above were employed; in Examples 25–32, complex compounds of titanium tetrachloride and an aromatic aldehyde were employed; in Examples 33–34, complex compounds β-cyanopropionaldehyde and titanium tetrachloride were used; in Example 35, the complex compound of β-formyl propionate and titanium tetrachloride was used; in Examples 36–44, complex compounds of the nitriles and titanium tetrachloride were used; in Examples 45–47 and 51, complex compounds of the aliphatic nitro compounds and titanium tetrachloride were used; in Examples 48–50 and 52, complex compounds of the aromatic nitro compounds and titanium tetrachloride were employed; and in Examples 53–66, complex compounds of the carboxylic acid esters and titanium tetrachloride were employed.

In the tables of the examples, "ttc" means trans.trans. cis-1,5,9 - cyclodoctatriene; "CDT" means cyclododecatriene; "$Et_3Al_2Cl_3$" means ethylaluminum sequichloride; and "$Et_2AlCl$" means diethylaluminum monochloride.

EXAMPLES 1–4

(I) Preparation of catalyst component:

In a four-necked flask equipped with a dropping funnel, a stirrer, and a condenser, 20.0 g. (0.106 mole) of pure titanium tetrachloride was dissolved in 100 ml. of water-free benzene in a nitrogen gas stream and 11.8 g. (0.106 mole) of pure N-vinylpyrrolidone was added slowly to the resulting solution with stirring. The reaction thereby proceeded readily, but no gas was formed. The orange crystals obtained were rinsed with water-free benzene and petroleum ether and dried under reduced pressure. The yield was 31.2 g.

The elementary analysis of the product as

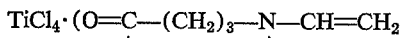

(molecular weight 301) is shown in the following table.

TABLE 1

| | Ti, percent | N, percent | Cl, percent |
|---|---|---|---|
| Calculated | 15.6 | 4.6 | 46.3 |
| Found | 16.4 | 4.3 | 45.2 |

By infrared absorption spectra, it was confirmed that the carbonyl of N-vinylpyrrolidone had been coordinated to the titanium atom. From these analyses, the product was confirmed to be a complex compound of

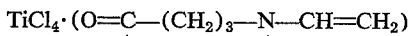

(hereinbelow, the complex compound is designated "TiCl$_4$·NVP")

Also, by a procedure similar to above, 10.0 g. (0.053 mole) of pure titanium tetrachloride was caused to react with 11.8 g. (0.106 mole) of N-vinylpyrrolidone in benzene to provide 20 g. of yellow crystals. The results of an elementary analysis of the product as

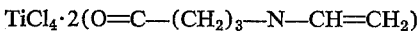

(molecular weight 412) are shown in the following table.

TABLE 2

| | Ti, percent | N, percent | Cl, percent |
|---|---|---|---|
| Calculated | 11.5 | 6.8 | 34.5 |
| Found | 11.3 | 6.0 | 33.1 |

By infrared absorption spectra, it was confirmed that two N-vinylpyrrolidones had been coordinated to the titanium atom at the carbonyl groups.

From these results, the product was confirmed to be a complex compound shown by

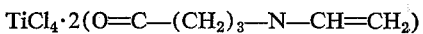

Hereinafter the complex compound is designated "TiCl$_4$·2NVP"

(II) Trimerization of 1,3-butadiene:

In a four-necked flask equipped with a stirrer, a gas-inlet pipe, and a thermometer, there were charged under a nitrogen gas atmosphere 100 ml. of water-free benzene, ethylaluminum sesquichloride, and TiCl$_4$·NVP or

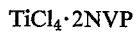

as shown in Table 3 below. The system was heated to 70° C. for five minutes with stirring. Then, after the temperature of the system was reduced to 35° C., the system was allowed to age for 30 minutes. Thereafter, while continuing stirring at a constant speed, desiccated butadiene was introduced in the liquid in the flask through the gas-inlet pipe. In this case, the temperature of the reaction system was considerably increased by the heat of reaction, and hence the reaction system was maintained at 40° C. by cooling the system. Under this condition, 54.1 g. (1 mole) of butadiene was blown into the system over a 150 minute period. The "blowing" rate for the butadiene was 0.13–0.15 liter/min. Thereafter, the system was stirred further for 30 minutes, and 10 ml. of ethanol were added to the reaction system to inactivate the catalyst therein.

The reaction product was washed with diluted hydrochloric acid and then water, and after removing the solvent from the system, the system was subjected to distillation under reduced pressure to provide trans.trans. cis-1,5,9-cyclododecatriene. From the amount of the materials remaining in the flask after distillation and the amount of cyclododecatriene, there was calculated the selective field of the product, the results of which are shown in Table 3.

TABLE 3

| Example: | Complex compound (m. mole) | Et$_3$Al$_2$Cl$_3$ (m. mole) | Ti/Al gram atom ratio | Conversion rate of butadiene (percent) | Selectivity to CDT (percent) Distillation value | Selectivity to CDT (percent) Gastromatographic value | Trans. trans. cis, percent |
|---|---|---|---|---|---|---|---|
| 1 | TiCl$_4$·NVP (0.0382) | 3.88 | 1/200 | 100 | 85 | 88 | 100 |
| 2 | TiCl$_4$·NVP (0.0764) | 3.88 | 1/100 | 99 | 86 | 94 | 100 |
| 3 | TiCl$_4$·2NVP (0.0382) | 3.88 | 1/200 | 96 | 85 | 89 | 100 |
| 4 | TiCl$_4$·2NVP (0.0764) | 3.88 | 1/100 | 98 | 84 | 86 | 100 |

EXAMPLES 5 AND 6

The trimerization of 1,3-butadiene was carried out by the same procedure as shown in (II), of the heretofore examples, except that diethylaluminum monochloride was employed as the alkylaluminum chloride. The results are shown in Table 4.

TABLE 4

| Example: | Complex compound (m. mole) | Et$_2$AlCl (m. mole) | Ti/Al gram atom ratio | Conversion rate of butadiene (percent) | Selectivity to CDT (percent) Distillation value | Selectivity to CDT (percent) Gaschromatographic value | Trans. trans. cis, percent |
|---|---|---|---|---|---|---|---|
| 5 | TiCl$_4$·NVP (2.70) | 13.5 | 1/5 | 90 | 86 | 88 | 71 |
| 6 | TiCl$_4$·2NVP (2.70) | 13.5 | 1/5 | 91 | 85 | 87 | 75 |

EXAMPLES 7–11

In a 80 ml. pressure tube were charged 0.55 millimole of TiCl$_4$.NVP or TiCl$_4$.2NVP as prepared in (I) of Examples 1–4, 2.75 millimoles of diethylaluminum monochloride or ethylaluminum sesquichloride, and 20 ml. of water-free benzene together with, if necessary, additives such as dimethyl sulfoxide (DMSO), thionyl chloride and the like. The system was then aged at 80° C. After cooling, 14.5 g. of dried butadiene was charged in the tube and after sealing the tube, the system was reacted for two hours at 50° C. with shaking. After the reaction was finished, 5 ml. of ethanol was added to the system to inactivate the catalyst and after removing the solvent, the system was subjected to distillation under a reduced pressure to provide the cyclododecatriene. The results are shown in the following table (Table 5).

The infrared absorption spectra thereof showed that the carbonyl group of cyclohexanone had been coordinated to the titanium atom.

TABLE 5

| Example | Complex compound (m. mole) | Alkylaluminum chloride (m. mole) | Additive (Ti/additive) | Conversion rate of butadiene (percent) | Selectivity to CDT (percent) Distillation value | Selectivity to CDT (percent) Gaschromatographic value | Trans. trans. cis, percent |
|---|---|---|---|---|---|---|---|
| 7 | TiCl$_4$·NVP (0.55) | Et$_2$AlCl (2.75) | | 90 | 70 | 72 | 39 |
| 8 | TiCl$_4$·NVP (0.55) | Et$_2$AlCl (2.75) | DMSO (1/1) | 93 | 75 | 76 | 36 |
| 9 | TiCl$_4$·NVP (0.55) | Et$_2$AlCl (2.75) | SOCl$_2$ (1/1) | 93 | 95 | 96 | 98 |
| 10 | TiCl$_4$·NVP (0.55) | Et$_3$Al$_2$Cl$_3$ (2.75) | SOCl$_2$ (1/1) | 92 | 75 | 76 | 99 |
| 11 | TiCl$_4$·2NVP (0.55) | Et$_2$AlCl (2.75) | | 89 | 73 | 75 | 41 |

EXAMPLES 12–18

I. Preparation of catalyst component:

In a four-necked flask equipped with a dropping funnel, a stirrer, and a condenser, 20.0 g. (0.106 mole) of pure titanium tetrachloride was dissolved in 100 ml. of water-free benzene in a nitrogen gas stream and thereafter 8.9 g. (0.106 mole) of pure cyclohexanone was gradually added to the resulting solution while stirring the solution, whereby the reaction proceeded smoothly. No gas was generated.

By this procedure, dark yellow precipitates were obtained, which were recovered, washed with water-free benzene and then dried under reduced pressure to provide 17.4 g. of product.

The product was subjected to elementary analysis and the results are shown in the following table, in which the calculated values are as TiCl$_4$·C$_6$H$_{10}$O (molecular weight 288).

TABLE 6

| | Ti, percent | C, percent | H, percent | Cl, percent |
|---|---|---|---|---|
| Calculated | 16.6 | 25.0 | 3.47 | 49.3 |
| Found | 16.9 | 26.1 | 3.81 | 48.8 |

The results of infrared absorption spectra showed that the carbonyl absorption of cyclohexanone at 1711 cm.$^{-1}$ was shifted at lower wave length sides of 1620–1605 cm.$^{-1}$, which showed the carbonyl group of cyclohexanone had been coordinated to the titanium atom. From these results, the product is considered to have the structure of

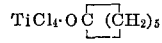

Hereinafter, this complex compound is designated "TiCl$_4$.CHAN."

From the above results, the compound obtained is considered to be a complex compound having the formula

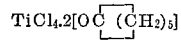

Hereinafter, the complex compound is designated "TiCl$_4$.2CHAN."

II. Trimerization of 1,3-butadiene:

In a four-necked flask equipped with a stirrer, a gas inlet-pipe, and a thermometer there were charged under a nitrogen gas atmosphere 100 ml. of water-free benzene (or water-free toluene, as indicated), ethylaluminum sesquichloride, and the complex compound of titanium tetrachloride and cyclohexanone as shown in Table 8. The system was then maintained for five minutes at 70° C. with stirring. Thereafter, the system was cooled to 35° C. and allowed to age for thirty minutes.

Thereafter, while maintaining the system at a temperature lower than 40° C., dry butadiene was introduced into the system through the gas-inlet pipe at a rate of 0.13–015 liter/min. Thus, 54 g. (1 mole) of butadiene was blown into the system over a 150-minute period. Thereafter, the system was stirred for a further 30 minutes and 10 ml. of ethanol alcohol was added to the reaction system to inactivate the catalyst. The reaction product was first washed with diluted hydrochloric acid and then water, the solvent was removed, and the resultant material was subjected to distillation under reduced pressure (or steam distillation) to provide trans.trans.cis-1,5,9-cyclododecatriene. From the amount of the high boiling material remaining in the flask after distillation and the amount of the cyclododecatriene distilled, the selectivity and the conversion percentage were calculated, the results of which are shown in Table 8.

TABLE 8

| Example | Complex compound (m.mole) | Et$_3$Al$_2$Cl$_3$ (m.mole) | Ti/Al gram atom ratio | Conversion rate of butadiene (percent) | Selective to CDT (percent) Distillation value | Selective to CDT (percent) Gaschromatographic value | Trans. trans, cis, percent |
|---|---|---|---|---|---|---|---|
| 12 | TiCl$_4$CHAN 0.074 | 3.70 | 1/100 | 98 | 90 | 90 | 100 |
| 13 | TiCl$_4$CHAN 0.037 | 3.70 | 1/200 | 100 | 89 | 90 | 100 |
| 14 | TiCl$_4$ CHAN 0.037 | 3.70 | 1/200 | 96 | 85 | 82 | 100 |
| 15 | TiCl$_4$CHAN 0.037 | 5.55 | 1/300 | 94 | 87 | 88 | 100 |
| 16 | TiCl$_4$CHAN 0.037 | 7.40 | 1/400 | 95 | 82 | 83 | 100 |
| 17 | TiCl$_4$.2CHAN 0.037 | 3.70 | 1/200 | 100 | 89 | 89 | 100 |

NOTE.—In Example 14, toluene was employed as the solvent.

Then, by the procedure heretofore used, 10.0 g. (0.053 mole), of pure titanium tetrachloride was caused to react with 8.9 g. (0.106 mole) of pure cyclohexanone in benzene. The reaction was exothermic and conducted without cooling the system. A purple transparent solution was first formed and then light-yellow crystals were gradually precipitated. The crystals were washed with water-free benzene and dried under reduced pressure to provide 12.0 g. of product.

The result of an elementary analysis of the product as TiCl$_4$.2(C$_6$H$_{10}$O) (molecular weight 386) is shown in the following table.

TABLE 7

| | Ti, percent | C, percent | H, percent | Cl, percent |
|---|---|---|---|---|
| Calculated | 12.4 | 37.4 | 5.18 | 36.8 |
| Found | 13.1 | 35.1 | 4.85 | 35.2 |

EXAMPLE 18

Into a four-necked flask equipped with a stirrer, a gas-inlet pipe, and a thermometer, there were charged under a nitrogen gas atmosphere, 960 ml. of water-free benzene, 29.6 millimoles of ethylaluminum sesquichloride and 0.296 millimole of a complex compound of titanium tetrachloride and cyclohexanone. The resulting mixture was maintained for five minutes at 80° C. with stirring. Thereafter, the system was cooled to 35° C. and then allowed to age for 30 minutes. Then, while maintaining the system at a temperature lower than 40° C., dry butadiene was introduced in the system through the gas-inlet pipe. About 1500 g. of butadiene was introduced over a period of about 7 or 8 hours at a rate of about 1.6–2.0 liters/min.

Thereafter, 25 ml. of methanol was added to the reaction system to inactivate the catalyst. After removing the solvent, the reaction system was subjected to distillation under reduced pressure to provide trans.trans.cis-1,5,9-cyclododecatriene. The conversion rate of butadiene was 92.3%, and the selectivity to 1,5,9-cyclododecatriene was 93.6%.

Furthermore, the same procedure as above was repeated using 640 ml. of water-free benzene, 30.0 milli-zene or toluene as solvent, and to the system there was introduced 54.1 g. (1 mole) of dry butadiene over a 150-minute period under the same conditions as in the examples. The cyclododecatrienes prepared were analyzed quantitatively by means of gas chromatography, and the results are shown in the following table.

TABLE 9

| Example: | Complex compound (m.mole) | $Et_3Al_2Cl_3$ (m.mole) | Ti/Al gram atom ratio | Yield CDT (g.) | Trans. trans. cis, percent |
|---|---|---|---|---|---|
| 20 | $TiCl_4$·AP 0.040 | 4.0 | 1/200 | 45.6 | 100 |
| 21 | $TiCl_4$·BP 0.120 | 12.0 | 1/200 | 41.5 | 100 |
| 22 | $TiCl_4$·A 0.037 | 7.4 | 1/400 | 30.3 | 100 |
| 23 | $TiCl_4$·BC 0.050 | 5.0 | 1/200 | 37.1 | 100 |

NOTE.—In Example 21, toluene was used as the solvent.

moles of aluminum sesquichloride, and 0.300 millimole of a complex compound of titanium tetrachloride and cyclohexanone, with introducing butadiene at a rate of 1.1 liters/min. over a seven hour period. The conversion rate of butadiene was 91.9%, and the selectivity to 1,5,9-cyclododecatriene was 92.7%.

EXAMPLE 19

Into a four-necked flask equipped with a stirrer, a monomer-inlet means, and a thermometer, there were charged, under an argon gas atmosphere, 100 ml. of water-free benzene, 3.7 millimoles of ethyl-aluminum sesquichloride, and 0.037 millimole of a complex compound of titanium tetrachloride and cyclohexanone. After heating the system at 80° C. for five minutes with stirring, the system was allowed to age at room temperature. Then, while maintaining the temperature of the reaction system lower than 40° C., 68 g. of dry isoprene was added dropwise within a 150-minute period.

Thereafter, the reaction was continued for a further 30 minutes, and thereafter 10 ml. of ethanol was added to the system to inactivate the catalyst. After removing the solvent, the system was subjected to distillation at high vacuum to provide 42 g. of a trimer of isoprene (boiling point 105–110° C./2 mm. Hg). The selectivity was 80%.

EXAMPLES 20–23

I. Preparation of catalyst component:

The following titanium tetrachloride.ketone complex compounds were prepared according to the material set out below:

(1) Complex compound of titanium tetrachloride and acetophenone (designated "$TiCl_4$.AP");

The complex compound was prepared by reacting titanium tetrachloride and an equimolar quantity of acetophenone in water-free benzene (Helvetica Chimica Acta; 41, 634 (1958)).

(2) Complex compound of titanium tetrachloride and benzophenone ($TiCl_4$.BP);

The complex compound was prepared by reacting titanium tetrachloride and an equimolar amount of benzophenone in water-free benzene (Helvetica Chimica Acta; 41, 634 (1958)).

(3) Complex compound of titanium and acetone ($TiCl_4$.A);

The complex compound was prepared by reacting titanium tetrachloride and an equimolar amount of acetone in water-free benzene (Helvetica Chimica Acta; 43, 852 (1960)).

(4) Complex compound of titanium tetrachloride and benzoyl chloride ($TiCl_4$.BC);

The complex compound was prepared by reacting titanium tetrachloride with an equimolar amount of benzoyl chloride in water-free cyclohexane (Helvetica Chimica Acta; 43, 424 (1960)).

II. Trimerization of 1,3-butadiene:

Into the apparatus described in Examples 12–18, were added each of the titanium tetra chloride complex compounds described and ethyl-aluminum sesquichloride, and a catalyst liquid was prepared by adding water-free benzene or toluene as solvent, and to the system there was introduced 54.1 g. (1 mole) of dry butadiene over a 150-minute period under the same conditions as in the examples. The cyclododecatrienes prepared were analyzed quantitatively by means of gas chromatography, and the results are shown in the following table.

EXAMPLE 24

By using the same method described immediately above, a catalyst composition was prepared by mixing 0.185 millimole of a complex compound of titanium tetrachloride and cyclohexanone and 3.70 millimoles of diethylaluminum chloride (Ti/Al=1/20 gram atom ratio), and when 54 g. of dry butadiene was introduced into the system at a reaction temperature lower than 50° C. over a three-hour period, 19.0 g. of cyclododecatriene was obtained.

EXAMPLES 25–32

I. Preparation of catalyst component:

The following complex compounds were prepared by reacting titanium tetrachloride and the aldehyde shown below by referring to the procedure in "Helvetica Chimica Acta"; 50, 2226 (1967).

I–1: Preparation of titanium tetrachloride.benzaldehyde complex compound:

By reacting 1 mole of benzaldehyde and 1 mole of titanium tetrachloride in water-free benzene under a nitrogen gas stream, a yellow complex compound was obtained ($TiCl_4$.BA). Similarly, from 2 moles of benzaldehyde and 1 mole of titanium tetrachloride, a faint yellow complex compound was obtained ($TiCl_4$.2BA).

I–2: Preparation of titanium tetrachloride.cinnamoaldehyde complex compound:

By reacting 1 mole of cinnamoaldehyde and 1 mole of titanium tetrachloride in water-free benzene, under a nitrogen gas stream, a yellow complex compound was obtained ($TiCl_4$.CA).

I–3: Preparation of titanium tetrachloride p-anisaldehyde complex compound:

By reacting 1 mole of p-anisaldehyde and 1 mole of titanium tetrachloride in carbon tetrachloride under a nitrogen gas stream, an orange complex compound was obtained ($TiCl_4$p-AA).

II. Trimerization of 1,3-butadiene:

Into a four-necked flask equipped with a stirrer, a gas inlet pipe and a thermometer, there were charged, under a nitrogen gas atmosphere, 100 ml. of water-free benzene or toluene, ethylaluminum sesquichloride, and the complex compound of titanium tetrachloride and aromatic aldehyde prepared above (as shown in Table 10), and then the system was maintained at 80° C. for five minutes with stirring. The system was then cooled to 35° C. and allowed to stand for 20–30 minutes. Thereafter, while the temperature of the system was maintained at 40° C., 54 g. of dry butadiene was introduced into the system at a rate of 200 ml./min. over a 2-hour period. Thereafter, 10 ml. of ethanol was added to the system to inactivate the catalyst and, by conventional techniques, cyclododecatrienes, mainly consisting of trans.trans.cis-1,5,9-cyclododecatriene, were obtained. A part of the reaction liquid was analyzed by means of gas chromatography and from this result, and also the result of analysis by distillation, the selectivity to cyclododecatriene and the conversion rate of butadiene were calculated, the results being shown in Table 10.

utes. Thereafter, while maintaining the system at 50° C., 54 g. of dry butadiene was blown into the system at 150

TABLE 10

| | Complex compound (m. mole) | $Et_3Al_2Cl_3$ (m. mole) | Ti/Al gram atom ratio | Conversion rate of butadiene (percent) | | Selectivity to CDT (percent) | |
|---|---|---|---|---|---|---|---|
| | | | | Gaschromato-graphic value | Distillation value | Gaschromato-graphic value | Distillation value |
| Example: | | | | | | | |
| 25 | $TiCl_4 \cdot BA$ 0.037 | 3.70 | 1/200 | 100 | 99 | 91.2 | 91.0 |
| 26 | $TiCl_4 \cdot BA$ 0.037 | 3.70 | 1/200 | 98 | 98 | 88.1 | 87.8 |
| 27 | $TiCl_4 \cdot BA$ 0.052 | 5.50 | 1/214 | 97 | 97 | 85.2 | 85.2 |
| 28 | $TiCl_4 \cdot BA$ 0.037 | 5.50 | 1/300 | 99 | 98 | 92.3 | 92.0 |
| 29 | $TiCl_4 \cdot 2BA$ 0.040 | 4.00 | 1/200 | 95 | 94 | 89.0 | 88.6 |
| 30 | $TiCl_4 \cdot CA$ 0.037 | 3.70 | 1/200 | 90 | 89 | 80.3 | 79.1 |
| 31 | $TiCl_4 \cdot CA$ 0.037 | 5.50 | 1/300 | 98 | 98 | 80.9 | 79.1 |
| 32 | $TiCl_4 \cdot P-AA$ 0.040 | 4.00 | 1/200 | 94 | 93 | 88.9 | 88.1 |

NOTE.—In Example 26, toluene was used as the solvent and in Example 27, the reaction was conducted in the presence of 0.20 millimole of sulfur.

ml./min. over a 140-minute period. Thereafter, the product was processed as in Examples 25–32. The results are shown in Table 11.

TABLE 11

| | Complex compound (m. mole) | $Et_3Al_2Cl_3$ (m. mole) | Ti/Al gram atom ratio | Conversion rate of butadiene (percent) | | Selectivity to CDT (percent) | |
|---|---|---|---|---|---|---|---|
| | | | | Gaschromato-graphic value | Distillation value | Gaschromato-graphic value | Distillation value |
| Example: | | | | | | | |
| 33 | $TiCl_4 \cdot 2CPA$ 0.040 | 4.00 | 1/200 | 90 | 89 | 82.9 | 82.0 |
| 34 | $TiCl_4 \cdot 2CPA$ 0.200 | 4.00 | 1/40 | 79 | 79 | 77.6 | 77.4 |
| 35 | $TiCl_4 2FMP$ 0.037 | 3.70 | 1/200 | 81 | 80 | 88.9 | 88.9 |

EXAMPLES 33–35

I. Preparation of catalyst component:

I-1: Preparation of the complex compound of titanium tetrachloride and β-cyanopropionaldehyde:

In water-free benzene, 0.4 mole of β-cyanoacrolein was added to 0.2 mole of titanium tetrachloride, with stirring, under a nitrogen gas stream, to provide a yellow precipitate at a good yield. When the elementary analysis of the product was conducted as $TiCl_4 \cdot 2HOC(CH_2)_2CN$, the following results were obtained:

Calculated: Ti, 13.46%; N, 7.88%; Cl, 39.90%. Found: Ti, 13.40%; N, 7.76%; Cl, 39.45%.

Also, from the infrared absorption spectra, it was confirmed that the aldehydecarbonyl group of β-cyanopropionaldehyde had been coordinated to the titanium atom.

From the above results, the complex compound obtained is considered to be a 1:2 adduct of titanium tetrachloride and β-cyanopropionaldehyde. ($TiCl_4.2CPA$).

I-2: Preparation of the complex compound of titanium tetrachloride and methyl β-formylpropionate:

To 0.2 mole of titanium tetrachloride was added (with stirring) 0.4 mole of methyl β-formylpropionate (in a nitrogen gas stream) using water-free benzene as a solvent, to provide yellow precipitates at a good yield. The results of an elementary analysis of the product as $$TiCl_4.2HOC-(CH_2)_2-CO_2CH_3$$

are as follows:

Calculated: Ti, 11.37%; C, 28.50%; H, 3.83%; Cl, 33.60%. Found: Ti, 11.58%; C, 28.13%; H, 3.89%; Cl, 33.40%.

From the infrared absorption spectra, it was confirmed that the aldehydecarbonyl group of the aldehyde had been coordinated to the titanium atom.

From the above result, the complex compound is considered to be a 1:2 adduct of titanium tetrachloride and methyl β-formylpropionate. ($TiCl_4.2FMP$).

II. Trimerization of 1,3-butadiene:

In a four-necked flask equipped with a stirrer, a gas-inlet tube and a thermometer, there were charged (under a nitrogen gas atmosphere) 85 ml. of water-free benzene, ethylaluminum sesquichloride, and the complex compound of titanium tetrachloride and the aldehyde as shown in Table 11, and then the system was maintained at 80° C. for five minutes with stirring. The system was then cooled to 46° C. and allowed to stand for 30 min-

EXAMPLES 36–42

I. Preparation of catalyst component:

I-1: Titanium tetrachloride. benzonitrile complex compound:

The complex compound of titanium tetrachloride and benzonitrile was prepared by following the procedure of "Doklady Akad. Nauk S.S.S.R."; 148, 1335 (1963), that is, 0.1 mole of benzonitrile was caused to react with 0.1 mole of titanium tetrachloride in water-free benzene as the solvent under a nitrogen gas stream to provide the yellow complex compound.

Similarly, by reacting 0.2 mole of benzonitrile and 0.1 mole of titanium tetrachloride, a complex compound was obtained.

The results of an elementary analyses of these complex compounds as $TiCl_4 \cdot C_6H_5CN$ (molecular weight 292.8) and $TiCl_4 \cdot —(C_6H_5CN)_2$ (molecular weight 396.0) are shown in the following table.

| Complex compound | Ti, percent | | Cl, percent | |
|---|---|---|---|---|
| | Found | Calculated | Found | Calculated |
| $TiCl_4 \cdot 2C_6H_5CN$ | 16.1 | 16.4 | 48.0 | 48.3 |
| $TiCl_4 \cdot 2C_6H_5CN$ | 11.9 | 12.1 | 35.3 | 35.8 |

From the above results, and the aforesaid report, it was clear that adducts of 1 mole of titanium tetrachloride and 1 mole and 2 moles of benzonitriles were formed.

I-2: Titanium tetrachloride.butyronitrile complex compound:

In a nitrogen gas stream, 0.2 mole of titanium tetrachloride was caused to react with 0.4 mole of n-butyronitrile in water-free benzene as the solvent. After the reaction was finished, the solvent, benzene, was removed to provide the faint-yellow complex compound.

The results of an elementary analysis of the product were: Ti, 14.1% and Cl, 42.9%, which coincides with the calculated values: Ti, 14.6% and Cl, 43.2%, as $TiCl_4 \cdot (C_3H_7CN)_2$ (molecular weight 327.9).

I-3: Titanium tetrachloride.acrylonitrile complex compound was prepared by following the procedure of the "Journal of Inorganic Nuclear Chemistry"; 25, 5 (1963).

That is, 0.1 mole of titanium tetrachloride was caused to react with 0.1 mole of acrylonitrile in a nitrogen gas stream using water-free benzene as the solvent. By removing benzene from the reaction product, yellow powders were obtained. The results of the elementary analysis thereof are as follows.

Calculated as TiCl$_4$·CH$_2$CHCN (molecular weight 242.77), Ti, 19.7% and Cl, 58.3%; found Ti, 19.2% and Cl, 57.6%.

The product was thus confirmed to be an adduct of 1 mole of titanium tetrachloride and 1 mole of acrylonitrile.

I-4: A complex compound of titanium tetrachloride and acetonitrile was prepared by the procedure described in "J. Chem. Soc.," 1963, 5665. That is, 0.1 mole of titanium tetrachloride was caused to react with 0.1 mole of acetonitrile in a nitrogen gas stream using water-free benzene as the solvent to provide yellow precipitates. The results of an elementary analysis thereof as TiCl$_4$·CH$_3$CN (molecular weight 230.75) are as follows: calculated Ti, 20.8% and Cl, 61.4%; found Ti, 20.4% and Cl, 60.7%. The product was confirmed to be a 1:1 adduct.

II. Trimerization of 1,3-butadiene:

Into a four-necked flask there were charged, under a nitrogen gas atmosphere, 85 ml. of water-free benzene or toluene, ethylaluminum sesquichloride, and the complex compound of titanium tetrachloride and the organic nitrile prepared above as in Table 13. The system was maintained at 80° C. for 10 minutes with stirring, and after cooling the system to 35° C., the system was allowed to stand for a period of time.

Thereafter, while maintaining the temperature of the system at 40° C., 54 g. of dry butadiene was introduced into the system at a rate of 200 ml./min. over a two-hour period through the gas-inlet pipe. Then, 10 ml. of ethanol was added to the system to inactivate the catalyst and thereafter, by conventional methods, cyclododecatrienes mainly consisting of trans.trans.cis-1,5,9-cyclododecatriene were obtained. The analysis of the product was conducted by means of the gas chromatographic method and the distillation method. The results are shown in Table 13.

II. Trimerization of 1,3-butadiene:

In a pressure tube were mixed 0.2 millimole of the complex compound of titanium tetrachloride and glutaronitrile prepared above, 1.0 millimole of diethylaluminum monochloride, and 30 ml. of benzene. The mixture was heated to 80° C. for aging. After supplying 20 g. of dry butadiene to the system, the system was reacted at 50° C. After the reaction was finished, the reaction product was processed by a conventional technique to provide 17.3 g. of cyclododecatriene. The yield thereof was 86.5% (to the butadiene supplied).

EXAMPLE 44

I. Preparation of catalyst component:

Complex compounds of titanium tetrachloride and chloroacetonitrile.

By reacting 0.1 mole of titanium tetrachloride and 0.1 mole of chloroacetonitrile in a nitrogen stream using benzene as the solvent, faint-yellow powders of the complex compound were obtained. The results of an elementary analysis of the product are as follows: Calculated as TiCl$_4$·NCCH$_2$Cl (molecular weight 265.19), Ti, 18.1% and Cl, 13.4%; found Ti, 18.0% and Cl, 13.1%.

II. Trimerization of 1,3-butadiene:

The same procedure as in Examples 36–42 was repeated while using 0.055 millimole of the complex compound of titanium tetrachloride and chloroacetonitrile, prepared above and 5.50 millimoles of ethylaluminum sesquichloride as the organic aluminum compound, whereby a cyclododecatriene was obtained with a selectivity of 80.1%. In addition, thhe conversion rate of butadiene was 93.4%.

EXAMPLES 45–50

I. Preparation of catalyst component:

The complex compound of titanium tetrachloride and a nitro compound was prepared according to the A. H. Norbury et al. method. (J. Chem. Soc. (A); 1966, 1814.)

That is, in a four-necked flask equipped with a dropping funnel, a stirrer, and a condenser, 0.058 mole of the

TABLE 13

| Complex compound (m.mole) | Et$_3$Al$_2$Cl$_3$ (m.mole) | Ti/Al gram atom, ratio | Conversion rate of butadiene (percent) | | Selectivity to CDI (percent) | |
|---|---|---|---|---|---|---|
| | | | Gaschromatographic value | Distillation value | Gaschromatographic value | Distillation value |
| Example: | | | | | | |
| 36 ........ TiCl$_4$·C$_6$H$_5$CN 0.037 .......... | 3.70 | 1/200 | 90.7 | 92.5 | 83.8 | 84.1 |
| 37 ........ TiCl$_4$·C$_6$H$_5$CN 0.055 .......... | 5.50 | 1/200 | 94.7 | 95.5 | 89.1 | 89.0 |
| 38 ........ TiCl$_4$·2C$_6$H$_5$CN 0.055 .......... | 5.50 | 1/200 | 93.1 | 92.8 | 88.8 | 88.4 |
| 39 ........ TiCl$_4$·2C$_3$H$_7$CN 0.055 .......... | 5.50 | 1/200 | 92.5 | 93.4 | 89.0 | 89.0 |
| 40 ........ TiCl$_4$·2CH$_3$CN 0.037 .......... | 5.50 | 1/400 | 99.0 | 97.1 | 90.2 | 90.0 |
| 41 ........ TiCl$_4$·CH$_3$CN 0.055 .......... | 5.50 | 1/200 | 100 | 94.4 | 90.6 | 89.6 |
| 42 ........ TiCl$_4$·CH$_2$CHCN 0.055 .......... | 5.50 | 1/200 | 70.1 | 70.0 | 64.2 | 64.0 |

NOTE.—In Example 42, toluene was used as the solvent.

EXAMPLE 43

I. Preparation of catalyst component:

The complex compound of titanium tetrachloride and glutanitrile was prepared by the process described in "Inorg. Chem."; 3 (6), 853 (1964).

That is, 0.1 mole of titanium tetrachloride and 0.1 mole of glutaronitrile were reacted in the presence of a solvent to provide a yellow complex compound.

The results of the elementary analysis of the product are as follows: calculated as TiCl$_4$·(CN)$_2$C$_3$H$_6$ (molecular weight 283.8), Ti 16.9% and Cl, 50.0%; found Ti, 16.3% and Cl, 49.1%.

pure nitro compound shown in Table 14 was added to 11.0 g. (0.058 mole) of pure titanium tetrachloride in a nitrogen gas stream while cooling the system, to provide yellow crystalline powders. The powders were washed with dehydrated petroleum ether and dried under reduced pressure. The yields and the results of elementary analysis are shown in Table 14, together with the structures of the products.

TABLE 14

| Nitro compound (L) | Amount (g.) | Ti/L | Yield of complex compound (g.) | Ti, percent | Cl, percent | Structure |
|---|---|---|---|---|---|---|
| Nitromethane ................. | 3.54 | 1/1 | 14.3 | 19.0 | 56.0 | [TiCl$_4$] [CH$_3$NO$_2$]. |
| Nitroethane .................. | 4.35 | 1/1 | 14.0 | 17.9 | 53.6 | [TiCl$_4$] [C$_2$H$_5$NO$_2$]. |
| Nitro 2-propane .............. | 5.17 | 1/1 | 13.2 | 17.1 | 50.4 | [TiCl$_4$] [(CH$_3$)$_2$CHNO$_2$]. |
| Nitrobenzene ................. | 7.14 | 1/1 | 15.5 | 15.6 | 44.5 | [TiCl$_4$] [C$_6$H$_5$NO$_2$]. |
| m-nitrotoluene ............... | 7.95 | 1/1 | 16.3 | 14.1 | 43.4 | [TiCl$_4$] [m-CH$_3$C$_6$H$_4$NO$_2$]. |
| Nitronaphthalene ............. | 10.04 | 1/1 | 18.1 | 13.2 | 40.0 | [TiCl$_4$] [α-C$_{10}$H$_7$NO$_2$]. | mole of glutaronitrile were reacted in the presence of a solvent to provide a yellow complex compound.

II. Trimerization of 1,3-butadiene:

Into a four-necked flask equipped with a stirrer, a gas-inlet pipe and a thermometer there were charged (under a nitrogen gas atmosphere) 100 ml. of water-free benzene, ethylaluminum sesquichloride, and the complex compound of titanium tetrachloride prepared above as in Table 15. The system was maintained at 80° C. for 10 minutes with stirring. Thereafter, the system was cooled to 35° C., and the system was allowed to stand for 30 minutes. Thereafter, while maintaining the temperature of the system at 40° C., 54 g. of dry butadiene was introduced into the system at a rate of 200 ml./min. over a two-hour period. After the reaction was finished, 10 ml. of ethanol was added to the system to inactivate the catalyst. After removing the solvent by distillation under reduced pressure, trans.trans.cis-1,5,9-cyclododecatriene was separated by distillation. The results of analyses are shown in Table 15.

stream) 0.063 g. (0.200 millimole) of the complex compound of titanium tetrachloride and nitrobenzene prepared in Example 48 and 1.00 millimole of diethylaluminum monochloride together with 30 ml. of water-free benzene. The system was heated to 80° C., with stirring, to provide a catalyst solution. After supplying 20 g. of butadiene to the system, it was reacted for two hours at 60° C. with stirring. After the reaction was finished, the solvent was removed and the system was subjected to distillation under reduced pressure to provide 15.1 g. of the cyclododecatriene.

TABLE 15

| | | | Conversion rate of butadiene (percent) | | Selectivity to CDT (percent) | |
|---|---|---|---|---|---|---|
| Complex compound and amount (g). | | $Et_3AlCl$ (m. mole) | Gaschromato-graphic value | Distillation value | Gaschromato-graphic value | Distillation value |
| Example: | | | | | | |
| 45 | $[TiCl_4][CH_3NO_2]$ 0.014 | 5.50 | 98.4 | 98.1 | 84.3 | 83.4 |
| 46 | $[TiCl_4][C_2H_5NO_2]$ 0.015 | 3.70 | 93.3 | 93.2 | 80.0 | 80.0 |
| 47 | $[TiCl_4][(CH_3)_2CHNO_2]$ 0.015 | 5.50 | 98.5 | 98.0 | 82.1 | 81.4 |
| 48 | $[TiCl_4][C_6H_5NO_2]$ 0.017 | 5.50 | 100 | 100 | 78.8 | 77.8 |
| 49 | $[TiCl_4][m\text{-}CH_3C_6H_4NO_2]$ 0.018 | 5.50 | 99.0 | 98.7 | 88.4 | 88.0 |
| 50 | $[TiCl_4][\phi\text{-}C_{10}H_7NO_2]$ 0.020 | 5.50 | 95.3 | 95.1 | 89.1 | 89.0 |

EXAMPLE 51

Into a flask equipped with a dropping funnel, a stirrer, and a condenser, 7.08 g. (0.116 mole) of pure nitromethane was added dropwise to 11.0 g. (0.058 mole) of pure titanium tetrachloride (under a nitrogen gas stream) while cooling the flask to provide faint-yellow powders. The powders which were washed with dehydrated petroleum ether and dried to provide 16.8 g. of the complex compound. The results of elementary analysis are: Ti, 15.1% and Cl, 45.2%. The structure of the compound is considered to be $[TiCl_4][CH_3NO_2]_2$.

Thereafter, in a four-necked flask equipped with a stirrer, a gas-inlet tube, and a thermometer there were charged (under a nitrogen gas atmosphere) 85 ml. of water-free benzene, 5.50 millmoles of ethylaluminum sesquichloride, and 0.014 g. of the complex compound of titanium tetrachloride and nitromethane prepared above.

The system was then cooled to 45° C. and allowed to stand for 30 minutes. Thereafter while the temperature of the system was maintained at 50° C., 54 g. of dry butadiene was introduced into the system at a rate of 200 ml./min. over a two-hour period through the gas-inlet pipe. After the reaction was finished, 10 ml. of ethanol was added to the system to inactivate the catalyst, and then 43.1 g. of trans.trans.cis-1,5,9-cyclododecatriene was obtained by distillation under reduced pressure. In this case, the conversion rate of butadiene was 90.4%, and the selectivity to cyclododecatriene was 88.4%.

EXAMPLE 52

Into a pressure tube were charged (in an argon gas

EXAMPLES 53–60

I. Preparation of catalyst component:

Into a four-necked flask equipped with a dropping funnel, a stirrer, and a condenser, there were charged (in a nitrogen gas atmosphere) 100 ml. of water-free benzene and 11.0 g. (0.058 mole) of pure titanium tetrachloride which dissolved in the benzene, and then, while stirring the system, 0.058 mole (or 0.106 mole) of each of the carboxylic acid esters shown in Table 16 was added to the system to provide yellow precipitates. In this case, no hydrogen chloride gas was formed. The precipitates were filtered in a nitrogen gas stream, washed with water-free benzene and petroleum ether, and dried under reduced pressure. The yield and the result of an elementary analysis of each of the complex compounds thus prepared are shown in Table 16.

TABLE 16

| Carboxylic ester (L) | Charged amount, g. | Ti/L (mole ratio) | Grams, yield of complex compound | Ti, percent | Cl, percent | Structure |
|---|---|---|---|---|---|---|
| Methyl benzoate | 7.90 | 1/1 | 14.3 | 14.2 | 41.3 | $[TiCl_4][C_6H_5CO_2CH_3]$ |
| Methyl benzoate | 15.80 | 1/2 | 22.1 | 10.0 | 30.8 | $[TiCl_4][C_6H_5CO_2CH_3]_2$ |
| Ethyl benzoate | 8.71 | 1/1 | 12.7 | 14.1 | 41.2 | $[TiCl_4][C_6H_5CO_2C_2H_5]$ |
| Phenyl propionate | 8.71 | 1/1 | 13.1 | 13.8 | 41.1 | $[TiCl_4][C_2H_5CO_2C_6H_5]$ |
| Dimethyl oxalate | 6.85 | 1/1 | 14.5 | 15.3 | 45.8 | $[TiCl_4][(CO_2CH_3)_2]$ |
| Dimethyl fumarate | 8.36 | 1/1 | 15.1 | 14.1 | 42.4 | $[TiCl_4][trans\,(CH)(Co_2CH_3)_2]$ |
| Dimethyl adipate | 10.10 | 1/1 | 15.6 | 13.0 | 38.0 | $[TiCl_4][(CH_2)_2(CO_2CH_3)_2]$ |
| Dimethyl terephthalate | 12.89 | 1/1 | 17.2 | 11.4 | 34.5 | $[TiCl_4][P\text{-}(C_6H_4)_2(CO_2CH_3)_2]$ |

II. Trimerization of 1,3-butadiene:

Into a four-necked flask equipped with a stirrer, a gas-inlet pipe and a thermometer, there were charged (under a nitrogen gas atmosphere) 100 ml. of water-free benzene, ethylaluminum sesquichloride, and the complex compound of titanium tetrachloride (as is shown in Table 17) and the system was maintained at 80° C. for 10 minutes with stirring. Thereafter, the temperature of the system was cooled to 45° C. and the system was allowed to stand for 30 minutes. While maintaining the system at 50° C., 54 g. of dry butadiene was blown into the system at a rate of 200 ml./min. over a two-hour period. After the reaction was finished, 10 ml. of ethanol was added to inactivate the catalyst and benzene was removed by distillation under reduced pressure to separate trans.trans. cis-1,5,9-cyclododecatriene by distillation.

The results are shown in Table 17.

gon gas atmosphere) 0.200 millimole of the complex compound prepared in Examples 53 and 62. 1.00 millimole of diethylaluminum chloride, and 30 ml. of water-free benzene. The system was heated to 80° C. with stir-

TABLE 17

| Titanium complex compound structure and amount (g.) | $Et_3Al_2Cl_3$ (m.mole) | Conversion rate of butadiene (percent) | | Selectivity to CDT (percent) | |
|---|---|---|---|---|---|
| | | Gaschromato-graphic value | Distillation value | Gaschromato-graphic value | Distillation value |
| Example: | | | | | |
| 53 ...... $(TiCl_4)(C_6H_5CO_2CH_3)0.018$ | 3.70 | 93.7 | 90.2 | 89.0 | 80.3 |
| 54 ...... $(TiCl_4(C_6H_5CO_2CH_3)_2 0.025$ | 5.50 | 93.0 | 89.1 | 88.5 | 88.0 |
| 55 ...... $(TiCl_4)(C_6H_5CO_2C_2H_5)0.019$ | 5.50 | 95.4 | 95.3 | 89.1 | 89.0 |
| 56 ...... $(TiCl_4)(C_2H_5CO_2C_6H_5)0.019$ | 5.50 | 96.9 | 94.3 | 79.1 | 78.3 |
| 57 ...... $(TiCl_4)(CO_2CH_3)_2 0.017$ | 5.50 | 97.1 | 97.4 | 77.3 | 77.0 |
| 58 ...... $(TiCl_4)(CH_2)(CO_2CH_3)_2 0.020$ | 5.50 | 97.4 | 94.2 | 88.2 | 87.8 |
| 59 ...... $(TiCl_4)(Trans-(CH_2)_2(CO_2CH_3)_2 0.018$ | 5.50 | 95.0 | 93.7 | 86.9 | 86.6 |
| 60 ...... $(TiCl_4)(P-(C_6H_4)(CO_2C_2H_5)_2 0.023$ | 5.50 | 93.4 | 93.0 | 85.1 | 84.8 |

EXAMPLES 61–64

I. Preparation of catalyst component:

Into a four-necked flask there were charged (under a nitrogen stream) 11.0 g. (0.058 mole) of titanium tetrachloride and 0.058 mole of the pure carboxylic ester shown in Table 18 (with stirring). Thereafter, yellow crystalline powders were obtained. In this case, no hydrogen chloride gas was formed. The precipitates were mixed with water-free petroleum ether, and the product was filtered in an argon stream. The product was washed with petroleum ether and dried under reduced pressure. The yields and the results of elementary analyses are shown in Table 18.

ring to provide a catalyst solution. To the system was introduced 20.0 g. of butadiene under a vacuum distillation, and the resulting mixture was reacted for two hours at 60° C., with stirring. After the reaction was finished, the solvent was removed and the system was subjected to distillation under reduced pressure to provide CDT. The results are shown in the following table.

TABLE 20

| Titanium complex compound (g.) | $Et_2AlCl$ (m.mole) | Conversion rate of butadiene (percent) | | Selectivity to CDT (percent) | |
|---|---|---|---|---|---|
| | | Gaschromato-graphic value | Distillation value | Gaschromato-graphic value | Distillation value |
| Example: | | | | | |
| 65 ...... $(TiCl_4)(C_6H_5CO_2CH_3) 0.065$ | 1.00 | 99.0 | 98.8 | 77.1 | 76.5 |
| 66 ...... $(TiCl_4)(C_2H_5CO_2CH_3) 0.056$ | 1.00 | 100 | 99.4 | 80.0 | 79.3 |

While the above has been described in connection with the preferred embodiments of this invention, it will be obvious to those skilled in the art that various changes and modifications may be made therein without departing from the scope of the invention, and it is intended therefore, to encompass within the appended claims, all

TABLE 18

| Carboxylic ester (L) | Ti/L (mole ratio) | Product (g.) | Ti, percent | Cl, percent | Structure |
|---|---|---|---|---|---|
| Ethyl acetate 5.10 | 1/1 | 11.3 | 17.2 | 51.6 | $(TiCl_4)(CH_3CO_2C_2H_5)$ |
| Methylpropionate 6.10 | 1/1 | 13.4 | 17.0 | 51.2 | $(TiCl_4)(C_2H_5CO_2CH_3)$ |
| Cyclohexyl acetate 8.19 | 1/1 | 15.2 | 14.1 | 42.8 | $(TiCl_4)(CH_3CO_2C_6H_{10})$ |
| Ethyl monochloroacetate 7.11 | 1/1 | 14.8 | 15.3 | 45.5 | $(TiCl_4)(ClCH_2CO_2C_2H_5)$ |

II. Trimerization of 1,3-butadiene:

Into a four-necked flask equipped with a stirrer, a gas-inlet pipe, and a thermometer, there were charged (under an argon gas atmosphere) 80 ml. of water-free benzene, ethylaluminum sesquichloride and the complex compound of the titanium compound prepared above. The system was maintained at 80° C. for 10 minutes. Thereafter, the temperature of the system was maintained at 40° C. and 54 g. of dry butadiene was blown into the system through the gas-inlet pipe at a rate of 200 ml./min. over a two hour period. After the reaction was finished, 10 ml. of ethanol was added to inactivate the catalyst. Thereafter, ethanol and benzene were removed, and then trans.trans. cis-1,5,9-cyclododecatriene was separated by distillation. The results of the analyses are shown in Table 19.

such changes and modifications as falling within the true spirit and scope of this invention.

What is claimed is:

1. A process for the production of a 1,5,9-cyclododecatriene which comprises trimerizing a conjugated open chain diolefin by contact with a catalyst comprising an alkylaluminum chloride and a preformed complex compound of titanium tetrachloride and a member selected from the group consisting of N-vinylpyrrolidone, a ketone, an aromatic aldehyde β-cyanopropionaldehyde, a β-formylpropionate, a nitrile, a carboxylic acid ester, an aliphatic nitro compound and an aromatic nitro compound.

2. The process as claimed in claim 1, wherein said diolefin is 1,3-butadiene.

TABLE 19

| Titanium complex compound structure and amount (g.) | $Et_3Al_2C_3$ (m.mole) | Conversion rate of butadiene (percent) | | Selectivity to CDT (percent) | |
|---|---|---|---|---|---|
| | | Gaschromato-graphic value | Distillation value | Gaschromato-graphic value | Distillation value |
| Example: | | | | | |
| 61 ...... $(TiCl_4)(CH_3CO_2C_2H_5) 0.015$ | 5.50 | 98.5 | 97.0 | 87.5 | 87.2 |
| 62 ...... $(TiCl_4)(C_2H_5CO_2CH_3) 0.015$ | 5.50 | 100 | 98.3 | 87.4 | 86.6 |
| 63 ...... $(TiCl_4)(CH_3CO_2C_6H_{10}) 0.018$ | 5.50 | 98.0 | 97.5 | 89.0 | 88.7 |
| 64 ...... $(TiCl_4)(ClCH_2CO_2C_2H_5) 0.017$ | 5.50 | 99.1 | 99.0 | 88.4 | 88.0 |

EXAMPLES 65–66

Into a pressure tube, there were charged (under an ar-

3. The process as claimed in claim 1, wherein said diolefin is isoprene.

4. The process as claimed in claim 1, wherein said alkylalumnum chloride is a compound represented by the general formula $$R_mAlCl_{3-m}$$

wherein R represents an alkyl group and $1.5 \leq m \leq 2$.

5. The process as claimed in claim 1, wherein said alkylaluminum chloride is diethylaluminum chloride.

6. The process as claimed in claim 1, wherein said alkylaluminum chloride is ethylaluminum sesquichloride.

7. The process as claimed in claim 1, wherein said carboxylic acid ester is selected from a compound represented by $R_1COOR_2$, wherein $R_1$ represents a member selected from the group consisting of an alkyl group, alkenyl group, a halogen substituted alkyl group, cyano substituted alkyl group, and aryl group, and $R_2$ represents a member selected from the group consisting of an alkyl group, a cycloalkyl group and an aryl group; and a compound represented by the general formula $$R_3OOCR_4COOR_3$$

wherein $R_3$ represents a member selected from the group consisting of an alkyl group and a cycloalkyl group and $R_4$ represents a member selected from the group consisting of an alkylene group and an arylene group.

8. The process as claimed in claim 1, wherein said preformed complex compound consists of one mole of titanium tetrachloride and from one to five moles of a member selected from the group consisting of N-vinylpyrrolidone, a ketone, an aromatic aldehyde, β-cyanopropionaldehyde, a β-formylpropionate, a nitrile, a carboxylic acid ester, an aliphatic nitro compound and an aromatic nitro compound.

9. The process as claim 1, wherein said catalyst contains the preformed complex compound of titanium tetrachloride and the organic compound and the alkylaluminum chloride in a ratio of 1 gram atom of titanium to at least 2 gram atoms of aluminum.

10. The process as claimed in claim 1, wherein said preformed complex compound is used in an amount of from 0.01 to 100 millimoles per one liter of the reaction mixture.

11. The process as claimed in claim 1, wherein an aromatic hydrocarbon is used as a reaction solvent.

12. The process as claimed in claim 1, wherein the reaction is conducted at a temperature of from −20° C. to 150° C.

13. The process as claimed in claim 1, wherein 1,5,9-cyclododecatriene is used as a reaction solvent.

14. The process as claimed in claim 1, wherein 1,5-octadiene is used as a reaction solvent.

15. A catalyst composition for the trimerization of a conjugated open chain diolefin comprising an alkylaluminum chloride and a preformed complex compound of a titanium tetrachloride and an organic compound selected from the group consisting of N-vinylpyrrolidone, a ketone, an aromatic aldehyde, β-cyanopropionaldehyde, a β-formylpropionate, a nitrile, a carboxylic acid ester, an aliphatic nitro compound and an aromatic nitro compound.

16. The catalyst composition as claimed in claim 15, wherein said alkylaluminum chloride is a compound represented by the general formula $R_mAlCL_{3-m}$, wherein R represents an alkyl group and $1.5 \leq m \leq 2$.

17. The catalyst composition as claimed in claim 15, wherein said alkylaluminum chloride is diethylaluminum chloride.

18. The catalyst composition as claimed in claim 15 wherein said alkylaluminum chloride is ethylaluminum sesquichloride.

19. The process of claim 1 which further comprises, after reaction, inactivating said catalyst.

20. The process of claim 1 wherein the alkyl group of said alkyl aluminum chloride contains from 2–6 carbon atoms.

21. The process of claim 1 wherein the ratio of the gram atoms of aluminum to the gram atoms of titanium in said catalyst is within the range 10 to 500.

22. The process of claim 1 wherein said catalyst consists essentially of said alkyl aluminum chloride and said preformed complex.

23. The catalyst composition of claim 15 wherein the alkyl group of said alkyl aluminum chloride contains from 2 to 6 carbon atoms.

24. The catalyst composition of claim 15 wherein the ratio of the gram atoms of aluminum to the gram atoms of titanium is in the range of 10 to 500.

25. The catalyst composition of claim 15 wherein one or two molecules of said organic compound are complex to one molecule of said titanium tetrachloride.

26. The catalyst composition of claim 15 wherein said catalyst consists essentially of said alkyl aluminum chloride and said preformed complex.

References Cited

UNITED STATES PATENTS

| | | | |
|---|---|---|---|
| 3,055,880 | 9/1962 | Raecke | 252—429B |
| 3,076,045 | 1/1963 | Schneider et al. | 260—666B |
| 3,149,173 | 9/1964 | Wittenberg et al. | 260—666B |
| 3,381,047 | 4/1968 | Eleaterio | 260—666B |
| 3,386,984 | 6/1968 | Schon et al. | 252—429B |

DELBERT E. GANTZ, Primary Examiner

V. A. O'KEEFE, Assistant Examiner